US011704385B2

(12) United States Patent
Chen et al.

(10) Patent No.: US 11,704,385 B2
(45) Date of Patent: Jul. 18, 2023

(54) TRAFFIC LIGHT DETECTION AUTO-LABELING AND FEDERATED LEARNING BASED ON VEHICLE-TO-INFRASTRUCTURE COMMUNICATIONS

(71) Applicant: TOYOTA RESEARCH INSTITUTE, INC., Los Altos, CA (US)

(72) Inventors: Kun-Hsin Chen, Mountain View, CA (US); Sudeep Pillai, Santa Clara, CA (US); Shunsho Kaku, Mountain View, CA (US); Hai Jin, Ann Arbor, MI (US); Peiyan Gong, Ann Arbor, MI (US); Wolfram Burgard, Mountain View, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 385 days.

(21) Appl. No.: 17/033,169

(22) Filed: Sep. 25, 2020

(65) Prior Publication Data
US 2022/0101045 A1 Mar. 31, 2022

(51) Int. Cl.
*G06K 9/00* (2022.01)
*G06F 18/214* (2023.01)
(Continued)

(52) U.S. Cl.
CPC ......... *G06F 18/214* (2023.01); *B60W 60/001* (2020.02); *G06F 18/217* (2023.01);
(Continued)

(58) Field of Classification Search
CPC . G06K 9/6256; G06K 9/6262; B60W 60/001; B60W 2552/00; B60W 2555/60;
(Continued)

(56) References Cited

U.S. PATENT DOCUMENTS

2020/0132477 A1* 4/2020 Averilla ............. G01C 21/3673
2021/0009133 A1* 1/2021 Mcnew ................. B60W 40/09
(Continued)

OTHER PUBLICATIONS

Langenberg, et al., "Automatic Traffic Light to Ego Vehicle Lane Association at Complex Intersections," 2018 21st International Conference on Intelligent Transportation Systems (ITSC), Maui, HI, 2018, pp. 1350-1357.
(Continued)

*Primary Examiner* — Dhaval V Patel
(74) *Attorney, Agent, or Firm* — Seyfarth Shaw LLP

(57) ABSTRACT

A method for traffic light auto-labeling includes aggregating vehicle-to-infrastructure (V2I) traffic light signals at an intersection to determine transition states of each driving lane at the intersection during operation of an ego vehicle. The method also includes automatically labeling image training data to form auto-labeled image training data for a traffic light recognition model within the ego vehicle according to the determined transition states of each driving lane at the intersection. The method further includes planning a trajectory of the ego vehicle to comply with a right-of-way according to the determined transition states of each driving lane at the intersection according to a trained traffic light detection model. A federated learning module may train the traffic light recognition model using the auto-labeled image training data during the operation of the ego vehicle.

18 Claims, 6 Drawing Sheets

(51) Int. Cl.
*B60W 60/00* (2020.01)
*G06V 20/58* (2022.01)
*G06F 18/21* (2023.01)

(52) U.S. Cl.
CPC ....... *G06V 20/584* (2022.01); *B60W 2552/00* (2020.02); *B60W 2555/60* (2020.02); *B60W 2556/45* (2020.02)

(58) Field of Classification Search
CPC ....... B60W 2556/45; B60W 30/18159; B60W 2420/42; B60W 2552/10; G06V 20/584; G06N 3/0454; G06N 3/063; G06N 3/08
See application file for complete search history.

(56) References Cited

U.S. PATENT DOCUMENTS

2021/0261152 A1* 8/2021 Meijburg ............. G08G 1/0116
2022/0083904 A1* 3/2022 Pastore ................. G06N 20/00

OTHER PUBLICATIONS

T. Langenberg, "Deep Learning Metadata Fusion for Traffic Light to Lane Assignment," doctoral dissertation, Georg-August University School of Science (GAUSS), Düsseldorf, Germany, 2019, found at https://d-nb.info/1191989100/34.

* cited by examiner

TRAFFIC LIGHT DETECTION AUTO-LABELING AND FEDERATED LEARNING BASED ON VEHICLE-TO-INFRASTRUCTURE COMMUNICATIONS

BACKGROUND

Field

Certain aspects of the present disclosure generally relate to machine learning and, more particularly, traffic light auto-labeling and federated learning based on vehicle-to-infrastructure communications.

Background

Autonomous agents (e.g., vehicles, robots, etc.) rely on machine vision for sensing a surrounding environment by analyzing areas of interest in images of the surrounding environment. Although scientists have spent decades studying the human visual system, a solution for realizing equivalent machine vision remains elusive. Realizing equivalent machine vision is a goal for enabling truly autonomous agents. Machine vision is distinct from the field of digital image processing because of the desire to recover a three-dimensional (3D) structure of the world from images and using the 3D structure for fully understanding a scene although object detection may be based on a two-dimensional camera input. That is, machine vision strives to provide a high-level understanding of a surrounding environment, as performed by the human visual system.

In operation, autonomous agents may rely on a trained deep neural network (DNN) to identify objects within areas of interest in an image of a surrounding scene of the autonomous agent. For example, a DNN may be trained to identify and track objects captured by one or more sensors, such as light detection and ranging (LIDAR) sensors, sonar sensors, red-green-blue (RGB) cameras, RGB-depth (RGB-D) cameras, and the like. In particular, the DNN may be trained to understand a scene from a camera (e.g., video/image) input based on annotations of automobiles within the scene. Unfortunately, annotating raw data (e.g., camera LIDAR, radar, etc.) is a challenging task involving deep understanding of visual scenes. Human annotation is extremely expensive, and impossible to annotate all raw data due to cost and time constraints.

SUMMARY

A method for traffic light auto-labeling includes aggregating vehicle-to-infrastructure (V2I) traffic light signals at an intersection to determine transition states of each driving lane at the intersection during operation of an ego vehicle. The method also includes automatically labeling image training data to form auto-labeled image training data for a traffic light recognition model within the ego vehicle according to the determined transition states of each driving lane at the intersection. The method further includes planning a trajectory of the ego vehicle to comply with a right-of-way according to the determined transition states of each driving lane at the intersection according to a trained traffic light detection model.

A non-transitory computer-readable medium includes program code recorded thereon for traffic light auto-labeling, in which the program code is executed by a processor. The non-transitory computer-readable medium includes program code to aggregate vehicle-to-infrastructure (V2I) traffic light signals at an intersection to determine transition states of each driving lane at the intersection during operation of an ego vehicle. The non-transitory computer-readable medium also includes program code to automatically label image training data to form auto-labeled image training data for a traffic light recognition model within the ego vehicle according to the determined transition states of each driving lane at the intersection. The non-transitory computer-readable medium further includes program code to plan a trajectory of the ego vehicle to comply with a right-of-way according to the determined transition states of each driving lane at the intersection according to a trained traffic light detection model.

A system for traffic light auto-labeling includes a traffic light learning model. The traffic light learning model configured to aggregate vehicle-to-infrastructure (V2I) traffic light signals at an intersection to determine transition states of each driving lane at the intersection during operation of an ego vehicle. The system also includes a traffic light auto-labeling module. The traffic light auto-labeling module is trained to automatically label image training data to form auto-labeled image training data for a traffic light recognition model within the ego vehicle according to the determined transition states of each driving lane at the intersection. The system further includes a planner module. The planner module is trained to plan a trajectory of the ego vehicle to comply with a right-of-way according to the determined transition states of each driving lane at the intersection according to a trained traffic light detection model.

This has outlined, rather broadly, the features and technical advantages of the present disclosure in order that the detailed description that follows may be better understood. Additional features and advantages of the present disclosure will be described below. It should be appreciated by those skilled in the art that the present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
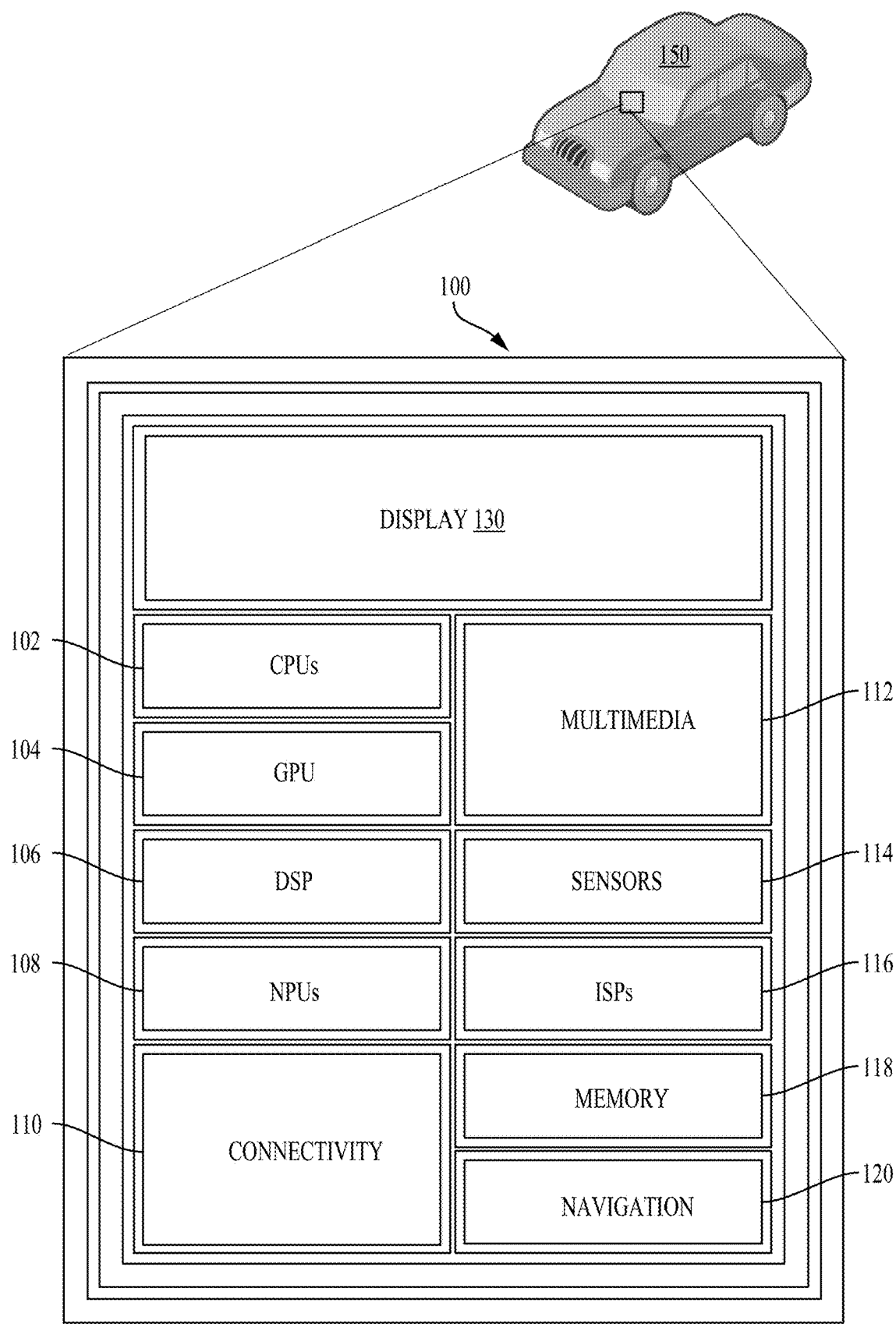
FIG. 1 illustrates an example implementation of designing a system using a system-on-a-chip (SOC) for traffic light auto-labeling with vehicle-to-infrastructure (V2I) communications, in accordance with aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure disclosed may be embodied by one or more elements of a claim.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses, or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

Deep learning often involves large labeled datasets to reach state-of-the-art performance. Learning-based traffic light (TL) detectors are shown as superior in their robustness in localizing and classifying traffic lights under different lighting conditions, weather, camera settings, and the like. Unfortunately, like all other learning-based computer-vision models, the conventional supervised training methods still rely heavily on large-scale annotated datasets. It is recognized that the performance of a learning-based model improves as the volume of data on which it is trained increases. Unfortunately, collecting, curating, and annotating a traffic light dataset is quite expensive. Also, uploading large amounts of raw data from vehicle to data server can involve a significant amount of data transmission with its associated cost and high use of network bandwidth. Also, human annotation is expensive.

Aspects of the present disclosure are directed to an improved method of training and evaluating the performance of a learning-based traffic light detector. For example, this learning-based traffic light detector detects the presence of traffic lights and their state information (the color of the lights and their transitions) based on image sensors. One aspect of a proposed learning-based traffic light detection system is a traffic light auto-labeling pipeline that makes use of vehicle-to-infrastructure (V2I) communications at intersections. By aggregating V2I traffic light signal data received at an intersection, it is possible to infer the transition states of all driving lanes (e.g., Go-straight: Yes/No, Turn-left: Yes/No, Turn-right: Yes, No, etc.) and automatically assign/label/annotate the transition states to image data. This is the auto-labeling aspect of the system.

In one aspect of the present disclosure, a traffic light auto-labeling system employs image classification or reinforcement learning (RL) methods to infer the transition states of a subject intersection. In some configurations, a traffic-light reinforcement learning training pipeline can be built from the auto-labeling pipeline for the training of RL-based agents that learn how to perform the planning in the compliance of the right-of-way indicated by the traffic lights at intersections. Another aspect of the present disclosure involves learning while driving (e.g., federated learning).

The auto-labeling pipeline discussed above supports federated learning. For example, a connected vehicle is equipped with a shared traffic light prediction model to collectively train the traffic light prediction model directly onboard as the vehicle is driven. This avoids uploading of voluminous data from connected vehicles to data sensor, which reduces the cost of data transmission fees and data storage while preserving data privacy. The more frequently the vehicle is driven, the smarter the model becomes.

According to aspects of the present disclosure, a connected vehicle is configured with a federated learning module. While standard machine learning approaches centralized training data on one machine or in a datacenter, the federated learning module supports collaborative learning of a shared prediction model among connected vehicles. This collaborative learning is performed while keeping all the training data localized on the connected vehicles. According to aspects of the present disclosure, federated learning enables connected vehicles to collaboratively learn a shared traffic light prediction model while keeping the training data on the connected vehicles. This federated learning overcomes the need to store the data in the cloud when performing machine learning.

In one configuration, a federated learning module provides privacy-preservation for a connected vehicle. In particular, because the training model is onboard of the connected vehicles, uploading of data to a centralized database is avoided. Rather, the federated learning module is configured to upload "gradients" (e.g., model updates) to a centralized server and the gradients can be also encrypted. According to this configuration, edge devices (e.g., connected vehicles) can enjoy a shared model upgrade, while retaining data locally and privately. Gradient based updates are cost efficient because large-scale raw data transmission/ management of conventional machine learning approaches are avoided.

In another aspect of the present disclosure, a personalized local traffic light prediction model may be trained on more "relevant" data. For example, over-the-air (OTA) model updates are avoided by performing training locally. In this example, it is possible for the model to slightly overfit to the traffic lights that a vehicle frequently drives through for improved performance on these traffic lights. According to aspects of the present disclosure, the federated learning module is enabled by traffic light vehicle-to-infrastructure (V2I) signals and an onboard auto-labeling module.

FIG. 1 illustrates an example implementation of the aforementioned system and method for traffic light auto-labeling with vehicle-to-infrastructure (V2I) communications using a system-on-a-chip (SOC) 100 of an ego vehicle 150. The SOC 100 may include a single processor or multi-core processors (e.g., a central processing unit (CPU)), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The system-on-a-chip (SOC) 100 may also include additional processing blocks configured to perform specific functions, such as the GPU 104, the DSP 106, and a connectivity block 110, which may include fourth generation long term evolution (4G LTE) connectivity, unlicensed Wi-Fi connectivity, USB connectivity, Bluetooth® connectivity, and the like. In addition, a multimedia processor 112 in combination with a display 130 may, for example, classify and categorize poses of objects in an area of interest, according to the display 130 illustrating a view of a vehicle. In some aspects, the NPU 108 may be implemented in the CPU 102, DSP 106, and/or GPU 104. The SOC 100 may further include a sensor processor 114, image signal processors (ISPs) 116, and/or navigation 120, which may, for instance, include a global positioning system (GPS).

The system-on-a-chip (SOC) 100 may be based on an Advanced Risk Machine (ARM) instruction set or the like. In another aspect of the present disclosure, the SOC 100 may be a server computer in communication with the ego vehicle 150. In this arrangement, the ego vehicle 150 may include a processor and other features of the SOC 100. In this aspect of the present disclosure, instructions loaded into a processor (e.g., CPU 102) or the NPU 108 of the ego vehicle 150 may include code for traffic light auto-labeling with vehicle-to-infrastructure (V2I) communications of objects (e.g., traffic signals) within an image captured by the sensor processor 114. The instructions loaded into a processor (e.g., CPU 102) may also include code for planning and control (e.g., of the ego vehicle 150) in response to the traffic light auto-labeling of images captured by the sensor processor 114.

Figure 2:
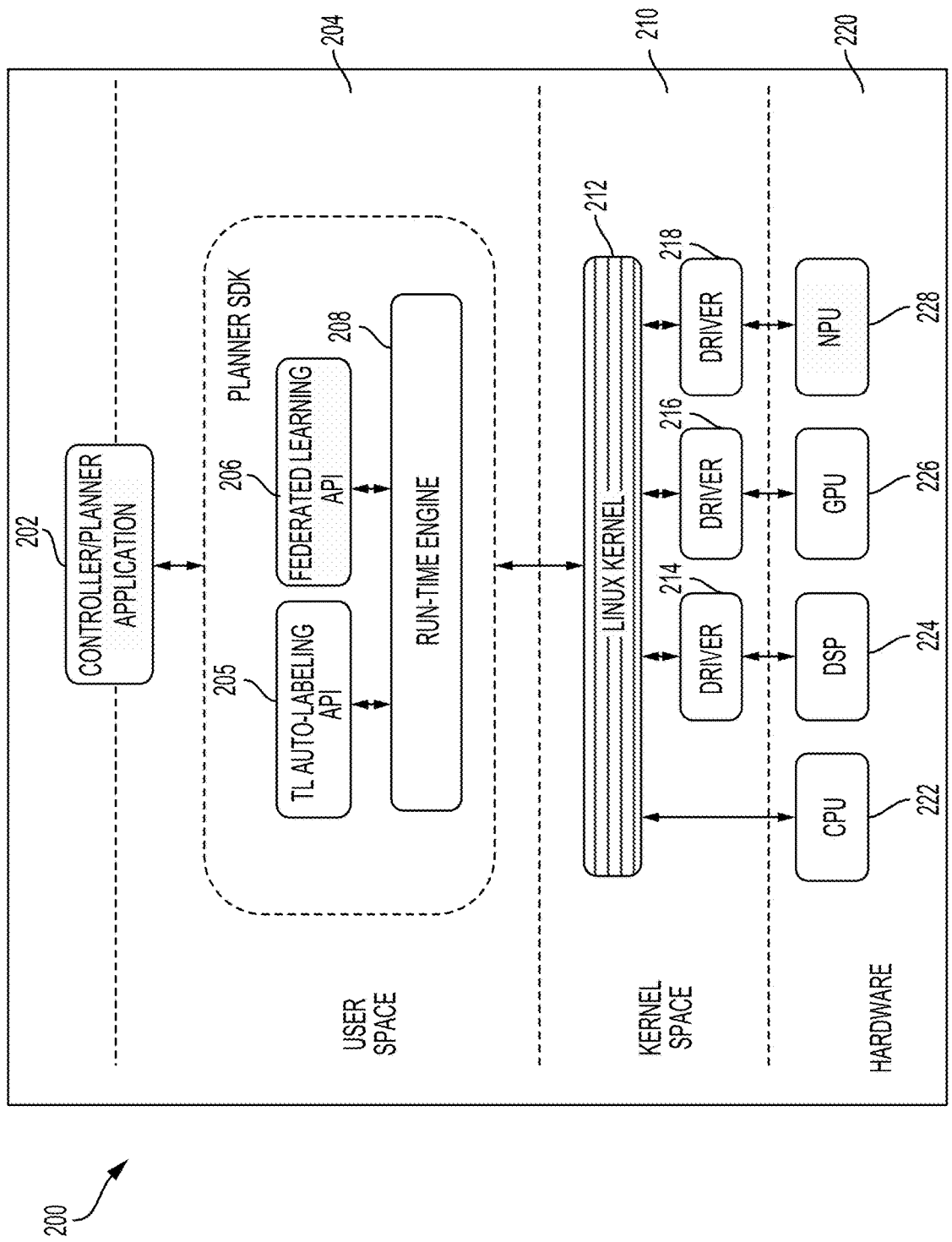
FIG. 2 is a block diagram illustrating a software architecture that may modularize functions for traffic light auto-labeling with vehicle-to-infrastructure (V2I) communications, according to aspects of the present disclosure.

FIG. 2 is a block diagram illustrating a software architecture 200 that may modularize functions for planning and control of an ego vehicle using traffic light auto-labeling with vehicle-to-infrastructure (V2I) communications, according to aspects of the present disclosure. Using the architecture, a controller/planner application 202 may be designed such that it may cause various processing blocks of a system-on-a-chip (SOC) 220 (for example a CPU 222, a DSP 224, a GPU 226, and/or an NPU 228) to perform supporting computations during run-time operation of the controller/planner application 202.

The controller/planner application 202 may be configured to call functions defined in a user space 204 that may, for example, analyze a scene in a video captured by a monocular camera of an ego vehicle based on traffic light (TL) auto-labeling of objects in the scene. In aspects of the present disclosure, TL auto-labeling of objects (e.g., traffic signals) of the video is improved by using vehicle-to-infrastructure (V2I). The controller/planner application 202 may make a request to compile program code associated with a library defined in a TL auto-labeling application programming interface (API) 205 to label traffic lights within a scene of a video captured by the monocular camera of the ego vehicle using V2I communications. The auto-labeling pipeline also enables federated learning using a federated learning API 206. For example, For example, a connected vehicle is equipped with a shared traffic light prediction model to collectively train the traffic light prediction model directly onboard as the vehicle is driven. The more frequently the connected vehicle is driven, the smarter the model becomes.

A run-time engine 208, which may be compiled code of a run-time framework, may be further accessible to the controller/planner application 202. The controller/planner application 202 may cause the run-time engine 208, for example, to perform monocular (single-camera) three-dimensional (3D) detection and auto-labeling. When an object is detected within a predetermined distance of the ego vehicle, the run-time engine 208 may in turn send a signal to an operating system 210, such as a Linux Kernel 212, running on the SOC 220. The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network (DNN) may be configured to run on a combination of processing blocks, such as the CPU 222 and the GPU 226, or may be run on the NPU 228, if present.

Figure 3:
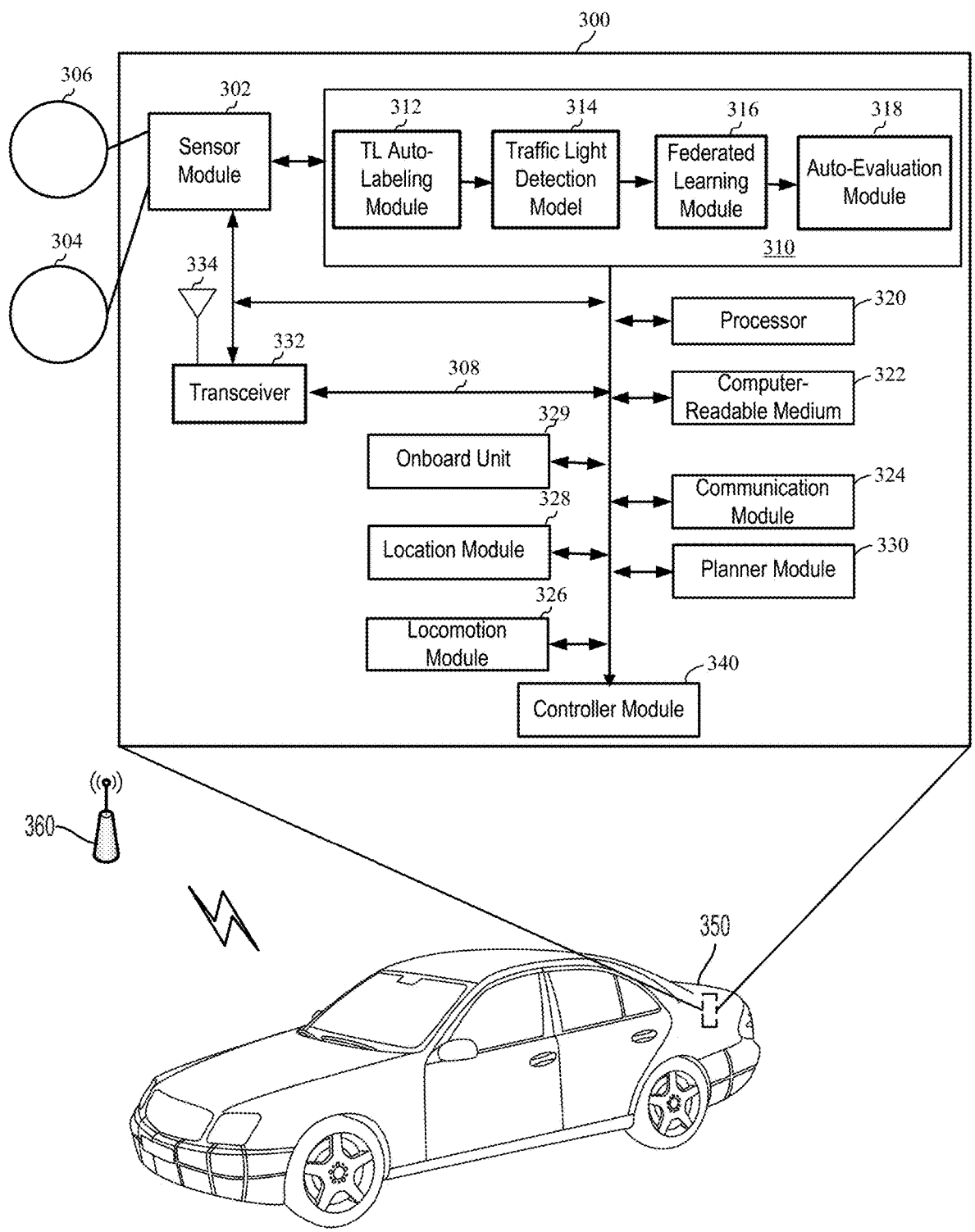
FIG. 3 is a diagram illustrating an example of a hardware implementation for a traffic light auto-labeling system with structural and physical constraints, according to aspects of the present disclosure.

FIG. 3 is a diagram illustrating an example of a hardware implementation for a traffic light auto-labeling system 300 using vehicle-to-infrastructure (V2I) communications, according to aspects of the present disclosure. The traffic light auto-labeling system 300 may be configured for understanding a scene to enable planning and controlling an ego vehicle in response to images from video captured through a camera during operation of a car 350. The traffic light auto-labeling system 300 also supports federated learning. For example, a connected vehicle may be equipped with a shared traffic light prediction model to collectively train the traffic light prediction model directly onboard as the connected vehicle is driven. This avoids uploading of voluminous data from connected vehicles to data servers, which reduces the cost while preserving data privacy. The more frequently the car 350 is driven, the smarter a shared traffic light prediction model becomes.

The traffic light auto-labeling system 300 may be a component of a vehicle, a robotic device, or other device. For example, as shown in FIG. 3, the traffic light auto-labeling system 300 is a component of the car 350. Aspects of the present disclosure are not limited to the traffic light auto-labeling system 300 being a component of the car 350, as other devices, such as a bus, motorcycle, or other like vehicle, are also contemplated for using the traffic light auto-labeling system 300. The car 350 may be autonomous or semi-autonomous.

The traffic light auto-labeling system 300 may be implemented with an interconnected architecture, represented generally by an interconnect 308. The interconnect 308 may include any number of point-to-point interconnects, buses, and/or bridges depending on the specific application of the traffic light auto-labeling system 300 and the overall design constraints of the car 350. The interconnect 308 links together various circuits, including one or more processors and/or hardware modules, represented by a sensor module 302, a vehicle perception module 310, a processor 320, a computer-readable medium 322, a communication module 324, a locomotion module 326, a location module 328, an onboard unit 329, a planner module 330, and a controller module 340. The interconnect 308 may also link various other circuits, such as timing sources, peripherals, voltage regulators, and power management circuits, which are well known in the art, and therefore, will not be described any further.

The traffic light auto-labeling system 300 includes a transceiver 332 coupled to the sensor module 302, the vehicle perception module 310, the processor 320, the computer-readable medium 322, the communication module 324, the locomotion module 326, the location module 328, the onboard unit 329, the planner module 330, and the controller module 340. The transceiver 332 is coupled to an antenna 334. The transceiver 332 communicates with various other devices over a transmission medium. For example, the transceiver 332 may receive commands via transmissions from a user or a remote device. As discussed herein, the user may be in a location that is remote from the location of the car 350. As another example, the transceiver 332 may transmit auto-labeled three-dimensional (3D) objects within a video and/or planned actions from the vehicle perception module 310 to a server (not shown).

The traffic light auto-labeling system 300 includes the processor 320 coupled to the computer-readable medium 322. The processor 320 performs processing, including the execution of software stored on the computer-readable medium 322 to provide functionality, according to the present disclosure. The software, when executed by the processor 320, causes the traffic light auto-labeling system 300 to perform the various functions described for ego vehicle perception of auto-labeled scenes within video captured by a single camera of an ego vehicle, such as the car 350, or any of the modules (e.g., 302, 310, 324, 326, 328, 330, and/or 340). The computer-readable medium 322 may also be used for storing data that is manipulated by the processor 320 when executing the software.

The sensor module 302 may obtain images via different sensors, such as a first sensor 304 and a second sensor 306. The first sensor 304 may be a vision sensor (e.g., a stereoscopic camera or a red-green-blue (RGB) camera) for capturing two-dimensional (2D) RGB images. The second sensor 306 may be a ranging sensor, such as a light detection and ranging (LIDAR) sensor or a radio detection and ranging (RADAR) sensor. Of course, aspects of the present disclosure are not limited to the aforementioned sensors, as other types of sensors (e.g., thermal, sonar, and/or lasers) are also contemplated for either of the first sensor 304 or the second sensor 306.

The images of the first sensor 304 and/or the second sensor 306 may be processed by the processor 320, the sensor module 302, the vehicle perception module 310, the communication module 324, the locomotion module 326, the location module 328, and the controller module 340. In conjunction with the computer-readable medium 322, the images from the first sensor 304 and/or the second sensor 306 are processed to implement the functionality described herein. In one configuration, detected three-dimensional (3D) object information captured by the first sensor 304 and/or the second sensor 306 may be transmitted via the transceiver 332. The first sensor 304 and the second sensor 306 may be coupled to the car 350 or may be in communication with the car 350.

Understanding a scene from a video input based on auto-labeling of three-dimensional (3D) objects within a scene is an important perception task in the area of autonomous driving, such as the car 350, although object detection is performed from two-dimensional (2D) camera video/images. Aspects of the present disclosure are directed to an improved method of training and evaluating the performance of a learning-based traffic light detector. For example, this learning-based traffic light detector detects the presence of traffic lights and their state information (the color of the lights and their transitions) based using the vehicle perception module 310. Another aspect of the disclosure is learning while driving (e.g., on-line/federated learning). The auto-labeling pipeline discussed above supports federated learning using a shared traffic light detection model in combination that is trained while a connected vehicle is driven.

One aspect of a proposed learning-based traffic light detection system is the traffic light auto-labeling system 300, using vehicle-to-infrastructure (V2I) communications at intersections with the onboard unit 329. In this configuration, the car 350 is configured as a connected vehicle using the onboard unit 329 to enable V2I communications. By aggregating V2I traffic light signal data received at an intersection, it is possible to infer the transition states of all driving lanes (e.g., Go-straight: Yes/No, Turn-left: Yes/No, Turn-right: Yes, No, etc.) and automatically assign/label/annotate the transition states to image data. This is the auto-labeling aspect of the system.

Connected vehicle applications support vehicle-to-vehicle (V2V) communications and vehicle-to-infrastructure (V2I) communications with wireless technology. For example V2V communications use wireless signals to send information back and forth between other connected vehicles (e.g., location, speed, and/or direction). Conversely, V2I communications involve V2I (e.g., road signs or traffic signals) communications, generally involving vehicle safety issues. For example, V2I communications may request traffic information from a traffic management system to determine best possible routes. V2V and V2I applications for connected vehicles dramatically increase automotive safety by transforming vehicle operation.

The location module 328 may determine a location of the car 350. For example, the location module 328 may use a global positioning system (GPS) to determine the location of the car 350. The location module 328 may implement a dedicated short-range communication (DSRC)-compliant GPS unit. A DSRC-compliant GPS unit includes hardware and software to make the car 350 and/or the location module 328 compliant with one or more of the following DSRC standards, including any derivative or fork thereof: EN 12253:2004 Dedicated Short-Range Communication— Physical layer using microwave at 5.9 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); and EN ISO 14906:2004 Electronic Fee Collection—Application interface.

A dedicated short-range communication (DSRC)-compliant global positioning system (GPS) unit within the location module 328 is operable to provide GPS data describing the location of the car 350 with space-level accuracy for accurately directing the car 350 to a desired location. For example, the car 350 is driving to a predetermined location and desires partial sensor data. Space-level accuracy means the location of the car 350 is described by the GPS data sufficient to confirm a location of the parking space of the car 350. That is, the location of the car 350 is accurately determined with space-level accuracy based on the GPS data from the car 350.

The communication module 324 may facilitate communications via the transceiver 332. For example, the communication module 324 may be configured to provide communication capabilities via different wireless protocols, such as Wi-Fi, long term evolution (LTE), third generation (3G), etc. The communication module 324 may also communicate with other components of the car 350 that are not modules of the traffic light auto-labeling system 300. The transceiver 332 may be a communications channel through a network access point 360. The communications channel may include dedicated short-range communication (DSRC), LTE, LTE-device-to-device (D2D) (LTE-D2D), mmWave, Wi-Fi (infrastructure mode), Wi-Fi (ad-hoc mode), visible light communication, TV white space communication, satellite communication, full-duplex wireless communications, or any other wireless communications protocol such as those mentioned herein.

In some configurations, the network access point 360 includes Bluetooth® communication networks or a cellular communications network for sending and receiving data, including via short messaging service (SMS), multimedia messaging service (MMS), hypertext transfer protocol (HTTP), direct data connection, wireless application protocol (WAP), e-mail, dedicated short-range communication (DSRC), full-duplex wireless communications, mmWave, Wi-Fi (infrastructure mode), Wi-Fi (ad-hoc mode), visible light communication, TV white space communication, and satellite communication. The network access point 360 may also include a mobile data network that may include third generation (3G), fourth generation (4G), fifth generation (5G), long term evolution (LTE), LTE-vehicle-to-everything (V2X) (LTE-V2X), LTE-device-to-device (D2D) (LTE-D2D), voice over long term evolution (VoLTE), or any other mobile data network or combination of mobile data networks. Further, the network access point 360 may include one or more Institute of Electrical and Electronics Engineers (IEEE) 802.11 wireless networks.

The traffic light auto-labeling system 300 also includes the planner module 330 for planning a selected trajectory to perform a route/action (e.g., collision avoidance) of the car 350, and the controller module 340 to control the locomotion of the car 350. The controller module 340 may perform the selected action via the locomotion module 326 for autonomous operation of the car 350 along, for example, a selected route. In one configuration, the planner module 330 and the controller module 340 may collectively override a user input when the user input is expected (e.g., predicted) to cause a collision according to an autonomous level of the car 350.

The modules may be software modules running in the processor 320, resident/stored in the computer-readable medium 322, and/or hardware modules coupled to the processor 320, or some combination thereof.

The National Highway Traffic Safety Administration (NHTSA) has defined different "levels" of autonomous vehicles (e.g., Level 0, Level 1, Level 2, Level 3, Level 4, and Level 5). For example, if an autonomous vehicle has a higher level number than another autonomous vehicle (e.g., Level 3 is a higher level number than Levels 2 or 1), then the autonomous vehicle with a higher level number offers a greater combination and quantity of autonomous features relative to the vehicle with the lower level number. These different levels of autonomous vehicles are described briefly below.

Level 0: In a Level 0 vehicle, the set of advanced driver assistance system (ADAS) features installed in a vehicle provide no vehicle control, but may issue warnings to the driver of the vehicle. A vehicle which is Level 0 is not an autonomous or semi-autonomous vehicle.

Level 1: In a Level 1 vehicle, the driver is ready to take driving control of the autonomous vehicle at any time. The set of ADAS features installed in the autonomous vehicle may provide autonomous features such as: adaptive cruise control (ACC); parking assistance with automated steering; and lane keeping assistance (LKA) type II, in any combination.

Level 2: In a Level 2 vehicle, the driver is obliged to detect objects and events in the roadway environment and respond if the set of ADAS features installed in the autonomous vehicle fail to respond properly (based on the driver's subjective judgement). The set of ADAS features installed in the autonomous vehicle may include accelerating, braking, and steering. In a Level 2 vehicle, the set of ADAS features installed in the autonomous vehicle can deactivate immediately upon takeover by the driver.

Level 3: In a Level 3 ADAS vehicle, within known, limited environments (such as freeways), the driver can safely turn their attention away from driving tasks, but must still be prepared to take control of the autonomous vehicle when needed.

Level 4: In a Level 4 vehicle, the set of ADAS features installed in the autonomous vehicle can control the autonomous vehicle in all but a few environments, such as severe weather. The driver of the Level 4 vehicle enables the automated system (which is comprised of the set of ADAS features installed in the vehicle) only when it is safe to do so. When the automated Level 4 vehicle is enabled, driver attention is not required for the autonomous vehicle to operate safely and consistent within accepted norms.

Level 5: In a Level 5 vehicle, other than setting the destination and starting the system, no human intervention is involved. The automated system can drive to any location where it is legal to drive and make its own decision (which may vary based on the jurisdiction where the vehicle is located).

A highly autonomous vehicle (HAV) is an autonomous vehicle that is Level 3 or higher. Accordingly, in some configurations the car 350 is one of the following: a Level 0 non-autonomous vehicle; a Level 1 autonomous vehicle; a Level 2 autonomous vehicle; a Level 3 autonomous vehicle; a Level 4 autonomous vehicle; a Level 5 autonomous vehicle; and an HAV.

The vehicle perception module 310 may be in communication with the sensor module 302, the processor 320, the computer-readable medium 322, the communication module 324, the locomotion module 326, the location module 328, the onboard unit 329, the planner module 330, the transceiver 332, and the controller module 340. In one configuration, the vehicle perception module 310 receives sensor data from the sensor module 302. The sensor module 302 may receive the sensor data from the first sensor 304 and the second sensor 306. According to aspects of the present disclosure, the vehicle perception module 310 may receive sensor data directly from the first sensor 304 or the second sensor 306 to perform traffic light auto-labeling of vehicle traffic signals detected from images captured by the first sensor 304 or the second sensor 306 of the car 350.

As shown in FIG. 3, the vehicle perception module 310 includes a traffic light (TL) auto-labeling module 312, a traffic light detection model 314, an online training module 316, and an auto-evaluation module 318 (e.g., based on video auto-labels). The TL auto-labeling module 312, the traffic light detection model 314, the online training module 316, and the auto-evaluation module 318 may be components of a same or different artificial neural network, such as a deep neural network (DNN). The traffic light detection model 314 and/or the online training module 316 is not limited to a DNN. In operation, the vehicle perception module 310 receives a data stream from the first sensor 304 and/or the second sensor 306. The data stream may include a two-dimensional red-green-blue (2D RGB) image from the first sensor 304 and light detection and ranging (LIDAR) data points from the second sensor 306. The data stream may include multiple frames, such as image frames. In this configuration, the first sensor 304 captures monocular (single camera) 2D RGB images.

The vehicle perception module 310 is configured to understand a scene from a video input (e.g., the sensor module) based on traffic light (TL) auto-labels describing objects (e.g., TL states) within the scene as a perception task during autonomous driving of the car 350. Aspects of the present disclosure are directed to streamlining and reducing the cost of labeling (annotating) training data for a vision-based TL detector (e.g., the traffic light detection model 314) in the car 350. The auto-labeled training data makes it possible to train the traffic light detection model 314 using image-classification or reinforcement-learning (RL) methods to infer the transition states of traffic lights at an intersection from image data. Another aspect of the present disclosure trains the traffic light detection model 314 in the car 350 and occasionally updates the traffic light detection model 314 via a model gradient server using the online training module 316, for example, as shown in FIG. 4.

Figure 4:
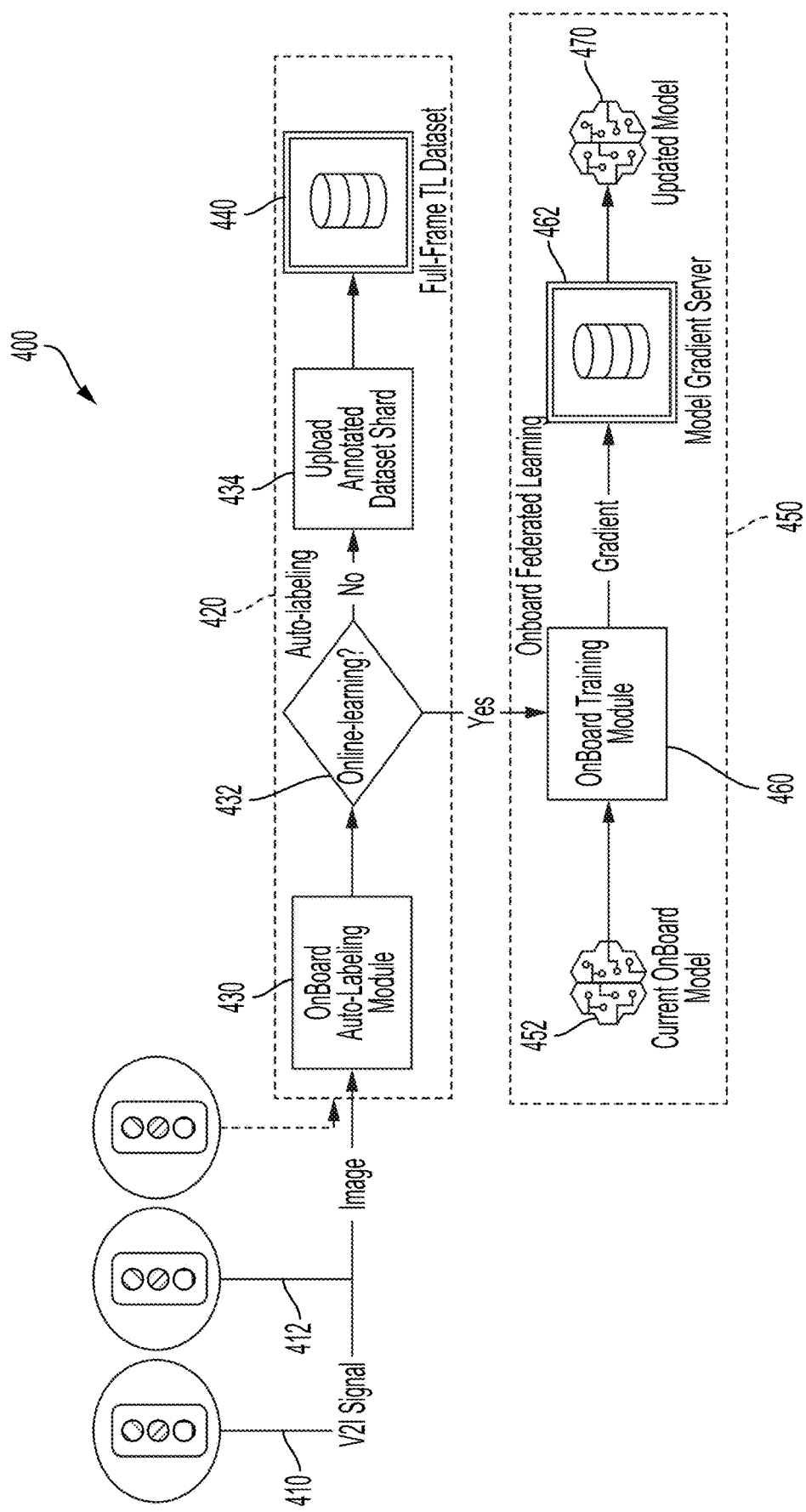
FIG. 4 is a block diagram of a three-dimensional (3D) auto-labeling pipeline for the 3D auto-labeling system of FIG. 3, according to aspects of the present disclosure.

FIG. 4 is a block diagram of a traffic light auto-labeling system 400 for the traffic light auto-labeling system 300 of FIG. 3, in accordance with an illustrative configuration of the present disclosure. As shown in FIG. 4, the traffic light auto-labeling system 400 includes an auto-labeling pipeline 420 and an federated learning module 450. In the example of FIG. 4, it may be determined whether a traffic light (TL) state is consistent with a current TL state determined from a vehicle-to-infrastructure (V2I) signal 410. The V2I signal 410 may be provided by a road side unit (RSU) at an intersection including a traffic signal. An image signal 412 of the current TL state is also provided.

The traffic light auto-labeling system 400 includes an onboard (in-vehicle) auto-labeling pipeline 420 that makes use of the vehicle-to-infrastructure (V2I) data at intersections, according to aspects of the present disclosure. By aggregating the V2I traffic light signals (e.g., the V2I signal 410) at an intersection, it is possible to infer the transition states of all driving lanes. For example, an onboard auto-labeling module 430 assigns/labels/annotates the transition states (e.g., Go-straight: Yes/No, Turn-left: Yes/No, Turn-right: Yes, No, etc.) within image data from the image signal 412. This is the auto-labeling aspect of the present disclosure. In this example, the auto-labeling pipeline 420 is configured to optionally perform online learning. Otherwise, at block 434 an annotated dataset shard from the onboard auto-labeling module 430 is uploaded to a full-frame traffic light (TL) dataset 440.

The traffic light auto-labeling system 400 may subsequently employ image classification or reinforcement learning (RL) methods to infer the transition states of the subject intersection. In some configurations, a traffic light reinforcement learning training pipeline is constructed from the auto-labeling pipeline 420. This traffic light reinforcement learning training pipeline enables training of reinforcement learning-based agents for learning to perform planning in compliance with the right-of-way indicated by the traffic light (TL) state at intersections. In this configuration, the federated learning module 450 includes a current onboard model 452, and an onboard training module 460 (e.g., a federated learning training module). When online learning is enabled at block 432, the onboard training module 460 performs learning while driving. The federated learning module 450 provides the vehicle with the onboard training module 460, which is configured to train the current onboard model 452 (e.g., a TL detection module) directly onboard the vehicle. In this configuration, the onboard training module 460 generates a gradient based on training of the current onboard model, which is provided to a model gradient server 462 to generate an updated model 470. This avoids data transmission, while reducing cost and preserves data privacy. According to this aspect of the present disclosure, the more frequently the vehicle is driven, the smarter the updated model 470.

Figure 5:
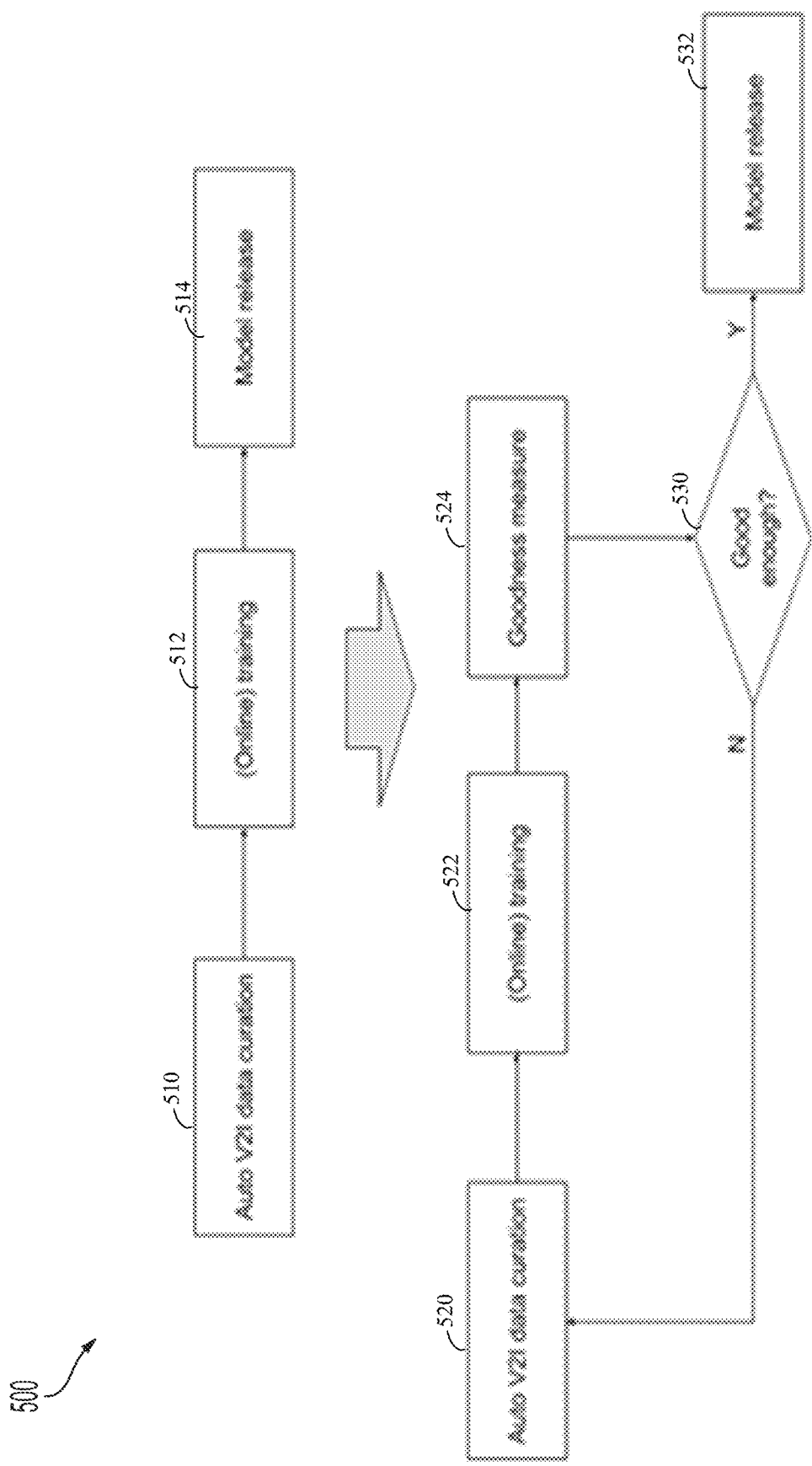
FIG. 5 illustrates surface projection of an object using signed-distance-fields (SDFs), according to aspects of the present disclosure.

FIG. 5 is a flowchart illustrating a method 500 for evaluating a performance level of a traffic light detection model, according to aspects of the present disclosure. In this aspect of the present disclosure, one portion of the traffic light auto-labeling system 300 of FIG. 3 is a "goodness" measure module (e.g., the auto-evaluation module 318). At block 510, an auto vehicle-to-infrastructure (V2I) data curation is performed. For example, the onboard auto-labeling module 430 of FIG. 4 generates training data for predicting traffic light transition state detection. At block 512, training is performed using the training data from the onboard auto-labeling module 430. Subsequently, the model is released at block 514, such as the traffic light detection model 314 of FIG. 3.

In one configuration, the auto-evaluation module 318 of FIG. 3 automatically evaluates or measures the goodness of the traffic light detection model 314 of FIG. 3 after training, using the training data from the traffic light auto-labeling module 312 of FIG. 3. At block 520, an auto vehicle-to-infrastructure (V2I) data curation is performed, for example, using the onboard auto-labeling module 430. At block 522, training is performed using the training data from the onboard auto-labeling module 430. At block 524, a goodness measure is performed on the traffic light detection model 314. If the traffic light detection model 314 is determined as sufficient, the traffic light detection model 314 is released to the car 350 via a model gradient server at block 532. Otherwise, blocks 520 to 524 are repeated, such that the traffic light auto-labeling module 312 actively curates additional auto-labeled training data until the traffic light detection model 314 satisfies a predetermined criteria at block 530.

Figure 6:
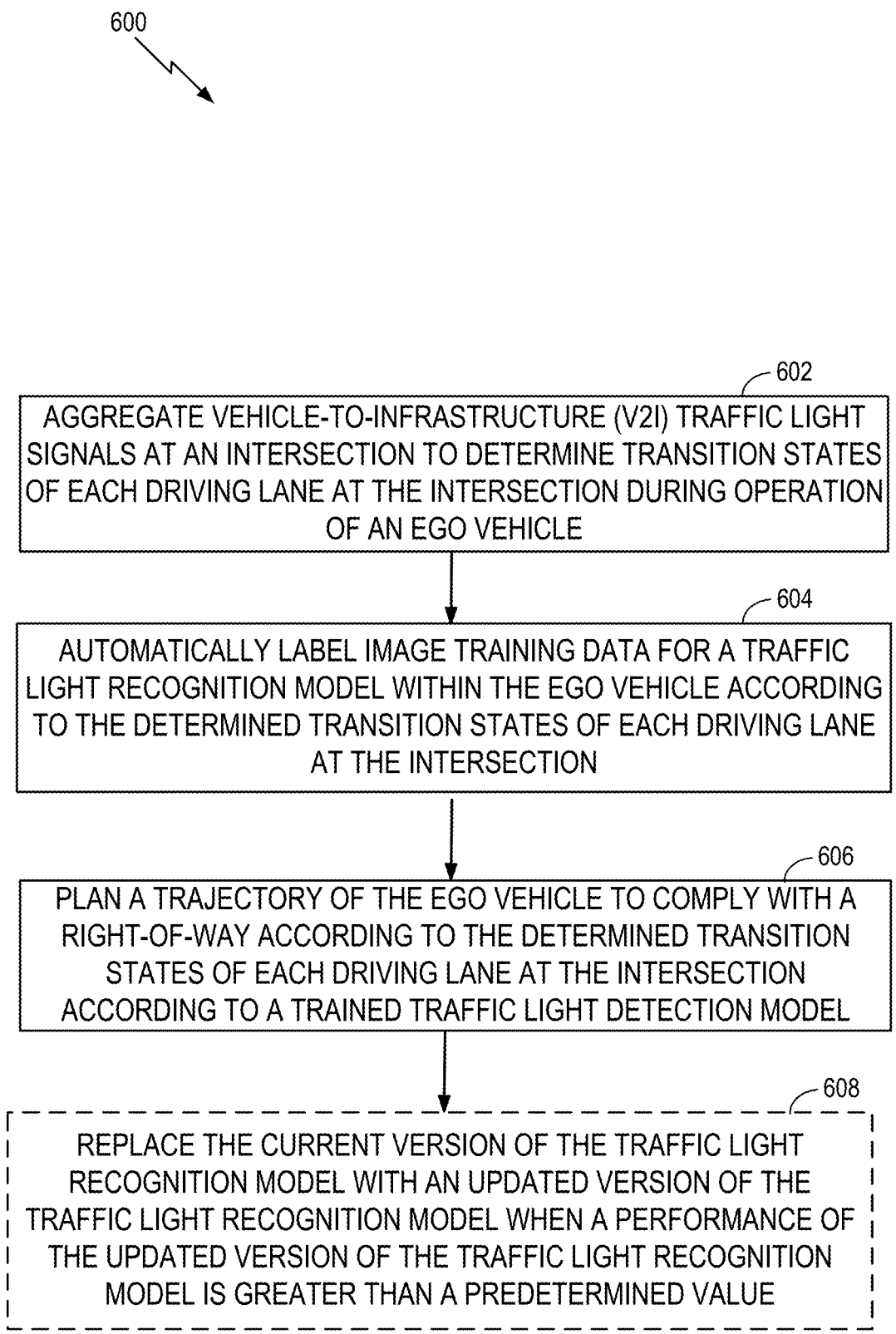
FIG. 6 is a flowchart illustrating a method of three-dimensional (3D) auto-labeling of objects with structural and physical constraints, according to aspects of the present disclosure.

FIG. 6 is a flowchart illustrating a method for traffic light auto-labeling, according to aspects of the present disclosure. The method 600 begins at block 602, in which vehicle-to-infrastructure (V2I) traffic light signals at an intersection are aggregated to determine transition states of each driving lane at the intersection during operation of an ego vehicle. For example, aggregating the vehicle-to-infrastructure (V2I) traffic light signals at an intersection to determine transition states of each driving lane at the intersection during operation of an ego vehicle may be performed as shown in FIG. 4. In this example, the traffic light auto-labeling system 400 includes an onboard (in-vehicle) auto-labeling pipeline 420 that makes use of the V2I data at intersections, according to aspects of the present disclosure. By aggregating the V2I traffic light signals (e.g., the V2I signal 406) at an intersection, it is possible to infer the transition states of all driving lanes using the onboard auto-labeling module 430.

At block 604, image training data for a traffic light recognition model within the ego vehicle is automatically labeled according to the determined transition states of each driving lane at the intersection. For example, automatically labeling the image training data may be performed as shown in FIG. 4. In this example, the onboard auto-labeling module 430 assigns/labels/annotates the transition states (e.g., Go-straight: Yes/No, Turn-left: Yes/No, Turn-right: Yes, No, etc.) within image data 404. In this example, an annotated dataset shard from the onboard auto-labeling module 430 is uploaded to a full-frame traffic light (TL) dataset 440.

At block 606, a trajectory of the ego vehicle is planned to comply with a right-of-way according to the determined transition states of each driving lane at the intersection according to a trained traffic light detection model. For example, as shown in FIG. 3, the planner module 330 is configured to plan a trajectory of an ego vehicle (e.g., car 350), according to the transition states (e.g., Go-straight: Yes/No, Turn-left: Yes/No, Turn-right: Yes, No, etc.) within image data 404, as shown in FIG. 4. In addition, the controller module 340 is configured to select vehicle control actions (e.g., acceleration, braking, steering, etc.).

At optional block 608, a current version of the traffic light recognition model is replaced with an updated version of the traffic light recognition model when a performance of the updated version of the traffic light recognition model is greater than a predetermined value. For example, the auto-evaluation module 318 of FIG. 3 automatically evaluates or measures the goodness of the traffic light detection model 314 of FIG. 3 after training using the training data from the traffic light (TL) auto-labeling module 312 of FIG. 3.

For example, as shown in FIG. 5, at block 524, a goodness measure is performed on the traffic light detection model 314. If the traffic light detection model 314 is determined as sufficient, the traffic light detection model 314 is released to the car 350 via a model gradient server at block 532. Otherwise, blocks 520 to 524 are repeated, such that the TL auto-labeling module 312 actively curates additional auto-labeled training data until the traffic light detection model 314 satisfies a predetermined criteria at block 530.

The method 600 further includes training the traffic light recognition model using the auto-labeled image training data during the operation of the ego vehicle. The method 600 also includes inferring state transitions of traffic lights at intersections during the operation of the ego vehicle using the trained traffic light detection model. In addition, the method 600 includes labeling additional image training data for training a current version of the traffic light recognition model when a performance of the current version of the traffic light recognition model is less than a predetermined value. The method 600 further includes training the current version of the traffic light recognition model using the auto-labeled image training data during the operation of the ego vehicle to form an updated version of the traffic light recognition model until the performance of the updated version of the traffic light recognition model is greater than the predetermined value.

In some aspects of the present disclosure, the method 600 may be performed by the system-on-a-chip (SOC) 100 (FIG. 1) or the software architecture 200 (FIG. 2) of the ego vehicle 150 (FIG. 1). That is, each of the elements of method 600 may, for example, but without limitation, be performed by the SOC 100, the software architecture 200, or the processor (e.g., CPU 102) and/or other components included therein of the ego vehicle 150.

The various operations of methods described above may be performed by any suitable means capable of performing the corresponding functions. The means may include various hardware and/or software component(s) and/or module(s), including, but not limited to, a circuit, an application-specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules, and circuits described in connection with the present disclosure may be implemented or performed with a processor configured according to the present disclosure, a digital signal processor (DSP), an application-specific integrated circuit (ASIC), a field-programmable gate array signal (FPGA) or other programmable logic device (PLD), discrete gate or transistor logic, discrete hardware components, or any combination thereof designed to perform the functions described herein. The processor may be a microprocessor, but, in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media may include random access memory (RAM), read-only memory (ROM), flash memory, erasable programmable read-only memory (EPROM), electrically erasable programmable read-only memory (EEPROM), registers, a hard disk, a removable disk, a compact disc-read-only memory (CD-ROM), and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits, such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, digital signal processors (DSPs), and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read-only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application-specific integrated circuit (ASIC) with the processor, the bus interface, the user interface, supporting circuitry, and at least a portion of the machine-readable media integrated into a single chip, or with one or more programmable gate arrays (PGAs), programmable logic devices (PLDs), controllers, state machines, gated logic, discrete hardware components, or any other suitable circuitry, or any combination of circuits that can perform the various functions described throughout the present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into random access memory (RAM) from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media, including any medium that facilitates transfer of a computer program from one place to another. A storage medium may be any available medium that can be accessed by a computer. By way of example, and not limitation, such computer-readable media can comprise random access memory (RAM), read-only memory (ROM), electrically erasable programmable read-only memory (EEPROM), compact disc-read-only memory (CD-ROM) or other optical disk storage, magnetic disk storage or other magnetic storage devices, or any other medium that can carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc; where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., random access memory (RAM), read-only memory (ROM), a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for traffic light auto-labeling, comprising:
    aggregating vehicle-to-infrastructure (V2I) traffic light signals at an intersection to determine transition states of each driving lane at the intersection during operation of an ego vehicle;
    automatically labeling image training data to form auto-labeled image training data for a traffic light recognition model within the ego vehicle according to the determined transition states of each driving lane at the intersection;
    planning a trajectory of the ego vehicle to comply with a right-of-way according to the determined transition states of each driving lane at the intersection according to a trained traffic light detection model;
    replacing a current version of the traffic light recognition model during operation of the ego vehicle with an updated version of the traffic light recognition model when a performance of the updated version of the traffic light recognition model is greater than a predetermined value; and
    operating the ego vehicle according to the updated version of the traffic light recognition model.

2. The method of claim 1, further comprising training the traffic light recognition model using the auto-labeled image training data during the operation of the ego vehicle.

3. The method of claim 1, in which replacing comprises:
    evaluating the current version of the traffic light recognition model; and
    training the current version of the traffic light recognition model using the auto-labeled image training data during the operation of the ego vehicle to form the updated version of the traffic light recognition model.

4. The method of claim 3, further comprising continuing training of the current version of the traffic light recognition model until the performance of the updated version of the traffic light recognition model is greater than the predetermined value.

5. The method of claim 1, further comprising:
    labeling additional image training data for training a current version of the traffic light recognition model when a performance of the current version of the traffic light recognition model is less than a predetermined value; and
    training the current version of the traffic light recognition model using the auto-labeled image training data during the operation of the ego vehicle to form an updated version of the traffic light recognition model until the performance of the updated version of the traffic light recognition model is greater than the predetermined value.

6. The method of claim 1, further comprising inferring state transitions of traffic lights at intersections during the operation of the ego vehicle using the trained traffic light detection model.

7. The method of claim 1, further comprising uploading the auto-labeled image training data to a centralized data server.

8. A non-transitory computer-readable medium having program code recorded thereon for traffic light auto-labeling, the program code being executed by a processor and comprising:
    program code to aggregate vehicle-to-infrastructure (V2I) traffic light signals at an intersection to determine transition states of each driving lane at the intersection during operation of an ego vehicle;
    program code to automatically label image training data to form auto-labeled image training data for a traffic light recognition model within the ego vehicle according to the determined transition states of each driving lane at the intersection;
    program code to plan a trajectory of the ego vehicle to comply with a right-of-way according to the determined transition states of each driving lane at the intersection according to a trained traffic light detection model;
    program code to replace a current version of the traffic light recognition model with an updated version of the traffic light recognition model during operation of the ego vehicle when a performance of the updated version of the traffic light recognition model is greater than a predetermined value; and
    program code to operate the ego vehicle according to the updated version of the traffic light recognition model.

9. The non-transitory computer-readable medium of claim 8, further comprising program code to train the traffic light recognition model using the auto-labeled image training data during the operation of the ego vehicle.

10. The non-transitory computer-readable medium of claim 8, in which program code to replace comprises:
   program code to evaluate the current version of the traffic light recognition model; and
   program code to train the current version of the traffic light recognition model using the auto-labeled image training data during the operation of the ego vehicle to form the updated version of the traffic light recognition model.

11. The non-transitory computer-readable medium of claim 10, further comprising program code to continue training of the current version of the traffic light recognition model until the performance of the updated version of the traffic light recognition model is greater than the predetermined value.

12. The non-transitory computer-readable medium of claim 8, further comprising:
   program code to label additional image training data for training a current version of the traffic light recognition model when a performance of the current version of the traffic light recognition model is less than a predetermined value; and
   program code to train the current version of the traffic light recognition model using the auto-labeled image training data during the operation of the ego vehicle to form an updated version of the traffic light recognition model until the performance of the updated version of the traffic light recognition model is greater than the predetermined value.

13. The non-transitory computer-readable medium of claim 8, further comprising program code to infer state transitions of traffic lights at intersections during the operation of the ego vehicle using the trained traffic light detection model.

14. The non-transitory computer-readable medium of claim 8, further comprising program code to upload the auto-labeled image training data to a traffic light dataset.

15. A system for traffic light auto-labeling, the system comprising:
   a traffic light learning model to aggregate vehicle-to-infrastructure (V2I) traffic light signals at an intersection to determine transition states of each driving lane at the intersection during operation of an ego vehicle;
   a traffic light auto-labeling module to automatically label image training data to form auto-labeled image training data for a traffic light recognition model within the ego vehicle according to the determined transition states of each driving lane at the intersection; and
   a planner module to plan a trajectory of the ego vehicle to comply with a right-of-way according to the determined transition states of each driving lane at the intersection according to a trained traffic light detection model;
   an auto-evaluation module to replace a current version of the traffic light recognition model with an updated version of the traffic light recognition model during operation of the ego vehicle when a performance of the updated version of the traffic light recognition model is greater than a predetermined value; and
   a controller to operate the ego vehicle according to the updated version of the traffic light recognition model.

16. The system of claim 15, further comprising a federated learning module to train the traffic light recognition model using the auto-labeled image training data during the operation of the ego vehicle.

17. The system of claim 15, further comprising:
   the auto-evaluation module to evaluate the current version of the traffic light recognition model; and
   a federated learning module to train the current version of the traffic light recognition model using the auto-labeled image training data during the operation of the ego vehicle to form the updated version of the traffic light recognition model.

18. The system of claim 17, in which the auto-evaluation module is configured to continue training of the current version of the traffic light recognition model using the federated learning module until the performance of the updated version of the traffic light recognition model is greater than the predetermined value.

* * * * *